(12) United States Patent  
Iwasaki

(10) Patent No.: US 8,729,438 B2  
(45) Date of Patent: May 20, 2014

(54) COVER, A CONTAINER ASSEMBLY INCLUDING THE COVER, A MOLDING DEVICE FOR MOLDING THE COVER AND A METHOD FOR MANUFACTURING THE COVER

(75) Inventor: Yoshihisa Iwasaki, Higashi-Osaka (JP)

(73) Assignee: Iwasaki Industry, Inc., Yamato-Koriyama, Nara (JP)

( * ) Notice: Subject to any disclaimer, the term of this patent is extended or adjusted under 35 U.S.C. 154(b) by 882 days.

(21) Appl. No.: 12/384,975

(22) Filed: Apr. 10, 2009

(65) Prior Publication Data
US 2009/0200296 A1 Aug. 13, 2009

Related U.S. Application Data

(63) Continuation of application No. PCT/JP2007/069867, filed on Oct. 11, 2007.

(30) Foreign Application Priority Data

Oct. 13, 2006 (JP) .................................. 2006-280237

(51) Int. Cl.
*H05B 6/80* (2006.01)
*B65D 51/18* (2006.01)

(52) U.S. Cl.
USPC ......... 219/735; 219/725; 219/730; 220/254.3

(58) Field of Classification Search
USPC ................. 219/735, 700, 725, 732–733, 762; 220/212, 226, 278, 716, 254, 306, 307, 220/338–339, 367, 368, 373, 375; 215/235, 215/237, 306, 217, 236; 426/118, 234; 222/546, 259, 545, 556, 563
See application file for complete search history.

(56) References Cited

U.S. PATENT DOCUMENTS

| 4,735,334 | A | * | 4/1988 | Abbott .......................... 222/546 |
| 5,363,978 | A | | 11/1994 | Molo ............................. 220/254 |
| 5,779,082 | A | * | 7/1998 | Miramon ....................... 220/212 |

FOREIGN PATENT DOCUMENTS

| JP | 45-20782 | 11/1962 | |
| JP | 2-42418 | 8/1984 | .............. B29C 45/26 |

(Continued)

OTHER PUBLICATIONS

TW Application No. 096138184, Office Action dated Dec. 17, 2010.

(Continued)

*Primary Examiner* — Quang Van
(74) *Attorney, Agent, or Firm* — Larry E. Henneman, Jr.; Gregory P. Gibson; Henneman & Associates, PLC

(57) ABSTRACT

A cover for covering an opening of a container for a food stuff includes a substantially flat cover body including at least one aperture and at least one substantially flat flap. The at least one flap includes a linear proximal end configured to connect with the cover body and allow the at least one flap to rotate with respect to the cover body. A lower surface of the at least one flap includes a protrusion configured to close the at least one aperture when the at least one flap is at a first position in which the at least one flap is in parallel with the cover body. The cover body and the at least one flap are integrally formed by a co-injection molding. The container and cover are suitable for heating a food stuff in a microwave.

19 Claims, 16 Drawing Sheets

(56) References Cited

FOREIGN PATENT DOCUMENTS

| | | | | |
|---|---|---|---|---|
| JP | 61-43022 | 8/1984 | ............ | B29C 45/44 |
| JP | 1-26425 | 12/1984 | ............ | B29C 45/44 |
| JP | 2-34208 | 6/1986 | ............ | B65D 43/16 |
| JP | 3-54059 | 8/1987 | ............ | B65D 51/16 |
| JP | 63-1747 | 1/1988 | | |
| JP | 63-67452 U | 5/1988 | | |
| JP | 64-35863 | 3/1989 | | |
| JP | 5-60418 | 8/1993 | | |
| JP | 7041030 | 2/1995 | ............ | B65D 51/16 |
| JP | 3029922 U | 7/1996 | ............ | B65D 81/34 |
| JP | 9077145 | 3/1997 | ............ | B65D 81/34 |
| JP | 2000-053116 | 2/2000 | | |
| JP | 20022362599 A | 12/2002 | ............ | B65D 85/50 |
| JP | 20022362599 B2 | 12/2002 | ............ | B65D 85/50 |
| JP | 2004113776 | 4/2004 | ............ | B65D 81/34 |
| JP | 2004123143 | 4/2004 | ............ | B65D 83/06 |
| JP | 2007091340 | 4/2007 | ............ | B65D 51/16 |
| TW | M244274 U | 9/2004 | | |
| TW | M292352 U | 6/2006 | | |

OTHER PUBLICATIONS

TW Application No. 096138184, Search Report dated Dec. 17, 2010 (English translation).

\* cited by examiner (a)

(b)

COVER, A CONTAINER ASSEMBLY INCLUDING THE COVER, A MOLDING DEVICE FOR MOLDING THE COVER AND A METHOD FOR MANUFACTURING THE COVER

CROSS REFERENCE TO RELATED APPLICATIONS

This application is a continuation, as authorized by 35 U.S.C. §365(c), of International Application No. PCT/JP2007/069867, filed on Oct. 11, 2007, which claims priority of Japanese Patent Application No. 2006-280237, filed on Oct. 13, 2006, the entire content and disclosure of the preceding applications are incorporated by reference into this application.

BACKGROUND OF THE INVENTION

1. Field of the Invention

This invention relates to a container assembly for a food stuff and a cover thereof. Further, this invention relates to the container assembly and the cover suitable for cooking a food stuff therein with a heating device such as a microwave.

2. Description of the Related Art

A container assembly comprising a container for a food stuff and a cover for covering an opening on a top of the container is often used in a daily life, for example, as a container assembly may contain a food stuff and then may be placed in a refrigerator for storage of the food stuff, or may be used as a lunch box.

It is advantageous that such a container assembly is repeatedly used. An exemplary preservation/storage may be to cover a food stuff in a bowl with a resin film and place the bowl in a refrigerator. This exemplary preservations/storage essentially requires waste of the resin film after its usage. On the other hand, the above mentioned container with the cover may not produce any waste.

In general, the cover of the container assembly for the food stuff may hygienically seal the container assembly. When the food stuff in the container assembly is microwaved, the cover has to be removed from the container. This is because an increase in an inner pressure of the container assembly during heating process due to an airtight sealing by the cover attached to the container may blow out the cover or destroy the container.

Japanese Patent No. 3513599 discloses a container assembly useful for solving the above-described inconvenience in use. FIG. 14 is a schematic perspective view of the container assembly disclosed in Japanese Patent No. 3513599. FIG. 15 is a longitudinal cross-sectional view of the container assembly shown in FIG. 14.

A container assembly (C) in FIG. 14 and FIG. 15 includes a container (B) and a cover (L). The container (B) for a food stuff is configured to have a bottom and side walls surrounding the bottom. The cover (L) covers an opening at a top of the container (B).

The cover (L) comprises a central area (M) and a peripheral area (P). The central area (M) and the peripheral area (P) connected each other are molded through a double-molding process.

The central area (M) includes an aperture (0). The peripheral area (P) connects with a flap (F). The flap (F) extends to a center of the cover (L) from the peripheral area (P). The protrusion (S) extending downwardly is formed on a bottom of the flap (F).

The flap (F) rotates upwardly and downwardly with respect to a proximal end (A) connecting with the peripheral area (P). When the flap (F) is in parallel with the top of the cover (L) by its downward rotation, the protrusion (S) engages with and closes the aperture (O) defined in the cover (L).

A container assembly (C) in FIG. 14 and FIG. 15 does not require to remove the cover (L) when heating the food stuff therein, because a the container assembly (C) may be capable of exhausting a water vapor from the food stuff or inflating air therein so as to avoid an excessive inner pressure.

Thus, the container assembly (C) in FIG. 14 and FIG. 15 can overcome the above-described inconvenience when in use.

The container assembly disclosed in Japanese Patent No. 3513599 has a disadvantage of high production cost although it has a superior feature to overcome the conventional inconvenience when in use, because the cover (L) is manufactured through the double-molding process which requires many process steps.

FIG. 16 shows a container assembly (C) which overcomes the expensive production cost caused by the double-molding process.

The container assembly (C) in FIG. 16 is substantially similar to a configuration of the container assembly (C) described relating to FIG. 14 and FIG. 15 except for a joint structure between the flap (F) and the cover (L) by an assembly process.

Thus, the flap (F) and the cover (L) are individually molded through a resin-molding process, and then integrally jointed each other through the assembly process.

The container assembly (C) in FIG. 16 can be manufactured without a complicated process such as the double-molding process. However, the assembly process is still required, therefore reduction in the manufacturing cost may not be enough.

Further, the container assembly (C) in FIG. 16 has another problem. The flap (F) and the cover (L) are originally separate components although they are integrated through the assembly process. During long usage, the flap (F) happens to drop off the cover (L). A reattachable configuration of the flap (F) may somehow overcome the above-described problem, but if the flap (F) is lost after dropping off, the container assembly is no longer reparable.

In order to solve the problems described above, the present invention provides a cover which can be manufactured without any complicated manufacturing processes. The present invention further provides a cover from which a flap does not fall. The present invention also provides a container assembly using the cover described above.

SUMMARY OF THE INVENTION

The present invention provides a cover for covering an opening of a container for a food stuff comprising: a substantially flat cover body including at least one aperture at least one substantially flat flap including a linear proximal end configured to connect with the cover body, the proximal end allowing the at least one flap to rotate with respect to the cover body, wherein a lower surface of the at least one flap includes a protrusion configured to close the at least one aperture of the cover body when the at least one flap is at a first position in which the at least one flap is in parallel with the cover body, the cover body and the at least one flap are integrally formed by a co-injection molding.

In one embodiment of the present invention, the proximal end of the at least one flap is located farther away from a center of the cover body than a distal end of the flap.

In another embodiment of the present invention, the proximal end of the flap is located closer to the center of the cover body than the distal end of the flap.

Yet in another embodiment of the present invention, the at least one aperture is formed in a vicinity of a periphery of the cover.

In another embodiment of the present invention, the cover is contoured in a multangular shape, and the at least one aperture is located in a vicinity of a corner of the cover.

In another embodiment of the present invention, the cover body includes a downward concave portion, a distal end of the flap partly covers over the concave portion when the at least one flap is at the first position.

In another embodiment of the present invention, the lower surface of the flap at the proximal end includes a groove with an arc cross section, and the groove and a flat upper surface of the flap appear when the at least one flap is at a second position in which the at least one flap stands uprightly to the cover body, so as to restrict an upward rotation of the flap up to the second position.

In another embodiment of the present invention, the cover body comprises a reception configured to receive the at least one flap when the at least one flap is in the first position, an upper surface of the at least one flap does not protrude over an upper surface of the cover body.

In another embodiment of the present invention, the cover is not deformed under a thermal condition less than 140 degrees centigrade.

In another embodiment of the present invention, the cover is molded from a high crystallinity polypropylene.

In another embodiment of the present invention, the at least one aperture comprises a plurality of the apertures in the cover body.

Another embodiment of the present invention further comprises a tab protruding outwardly from a peripheral edge of the cover.

The present invention further provides a container assembly for a food stuff comprising a container including a bottom and at least one side wall surrounding the bottom, and a cover for closing an opening of the container, wherein the cover comprising: at least one substantially flat cover body including a linear proximal end configured to connect with the cover body, the proximal end allowing the at least one flap to rotate with respect to the cover body; a protrusion configured to close the at least one aperture of the cover body when the at least one flap is in the first position where the at least one flap is in parallel with the cover body, the cover body and the at least one flap are integrally formed by a co-injection molding.

In another embodiment of the present invention, the cover comprises: a peripheral area defining a peripheral contour of the cover; a flap surrounding area at least partly surrounding the at least one flap; and an intermediate area configured to connect the peripheral area with the flap surrounding area so that an upper surface of the peripheral area and an upper surface of the flap surrounding area are located above an upper surface of the intermediate area; the bottom of the container comprises: a peripheral area defining a peripheral contour of the bottom; and a central area at least partly surrounded by the peripheral area of the container, so that a bottom surface of the central area is located above a bottom surface of the peripheral area, the intermediate area is configured to at least partly engage with the peripheral area of the container while the central area is configured to engage with the flap surrounding area in a stacking package of the container assemblies.

In another embodiment of the present invention, the peripheral area of the cover body is formed to have a U-shaped cross section so as to be engageable with an upper edge of the container.

In another embodiment of the present invention, the cover is formed in a cylindrical shape comprising a top and a threaded inner surface, wherein a threaded outer surface of an upper portion of the container engages with the threaded inner surface of the cover.

In another embodiment of the present invention, the cover is formed in a disc shape of which outer surface is threaded, wherein a threaded inner surface of an upper portion of the container assembly engages with the threaded outer surface of the cover.

In another embodiment of the present invention, the at least one flap rotates upwardly from the first position when an inner pressure of the container assembly is greater than a predetermined pressure.

In another embodiment of the present invention, a partition configured to divide an inner space of the container into at least two compartments, wherein the at least one aperture is in fluid communication with each of the at least two compartments, and the at least one flap closes the at least one aperture is in fluid communication with each of the at least two compartments.

The present invention further provides a molding device for molding a cover including a substantially flat cover body with at least one aperture, and at least one substantially flat flap including a linear proximal end configured to connect with the cover body and a protrusion configured to close the at least one aperture of the cover body when the at least one flap is in the first position where the at least one flap is in parallel with the cover body, the proximal end allowing the at least one flap to rotate with respect to the cover body comprising: a fixed mold and a moveable mold configured to form a first cavity therebetween for molding the cover body, the fixed mold including a second cavity for molding the at least one flap, the second cavity communicating with and extending perpendicularly to the first cavity, wherein the fixed mold comprises: a lateral sliding block including a molding surface configured to mold at least one flap surface including a protrusion is biased toward a protruding direction of the protrusion of at least one molded flap, a vertical sliding block including a slope surface complementary to and adjacent to a slope surface of the lateral sliding block opposite to the molding surface, a longitudinal movement of the vertical sliding block causing the lateral movement of the lateral sliding block in a protruding direction of the protrusion.

The present invention further provides a method for molding a cover including a substantially flat cover body with at least one aperture, and at least one substantially flat flap including a linear proximal end configured to connect with the cover body and a protrusion configured to close the at least one aperture of the cover body when the at least one flap is at the first position in which the at least one flap is in parallel with the cover body, the proximal end allowing the at least one flap to rotate with respect to the cover body using a molding device including a moveable mold and a fixed mold, the fixed body including a lateral sliding block including a molding surface configured to mold at least one flap surface including a protrusion is biased toward a protruding direction of the protrusion of at least one molded flap, and a vertical sliding block including a slope surface complementary to and adjacent to a slope surface of the lateral sliding block opposite to the molding surface forming a contour of the surface on which the protrusion is formed includes the slope surface causing the lateral movement of the lateral sliding block in the protruding direction of the protrusion formed in the at least one flap of the molded cover, comprising: forming a first cavity between the fixed mold and the moveable mold for molding the substantially flat cover body, so that the first cavity communicates with a second cavity inside the fixed mold for molding the at least one flap, injecting a molten resin into the first and the second cavity to mold the cover; and separating the moveable mold from the fixed mold in an open position to remove the molded cover.

A cover of the present invention is configured to exhaust a water vapor from a food stuff or an inflating air in a container assembly through at least one aperture by upwardly rotating a flap (e.g. when heating the food stuff inside the container assembly). Therefore, the cover does not have to be removed from the container when heating. Further, the food stuff in the container assembly may be hygienically stored (for example, in a refrigerator) by engaging a protrusion of the flap with the aperture of the cover body after rotating the flap downwardly.

The cover body and the at least one flap are formed by a co-injection molding without requiring any complicated additional process such as a double-molding process or an assembly process. Further, the flap does not drop off the cover. An attempt to mold the cover including the at least one flap by the co-injection molding has not been made due to the complicated shape of the cover. However, thanks to many researches for a resin-molding mold by the present inventors, the flap and the cover can be molded by the co-injection molding, i.e. by injecting a molten resin into a cavity defining the cover body and a flap standing uprightly with respect to the cover body.

A location or direction of the flap of the present invention is not limited. For example, the configuration of the container assembly described relating to FIG. 14 and FIG. 15, the flap location is limited to a peripheral area, and a directional vector from a proximal end to a distal end of the flap has to be always oriented to a center of the cover. In the present invention, on the other hand, the flap and the cover body are molded through a co-injecting molding process, so that the flap can be molded at any desired position on the cover body. Thus, the flap can be provided in a central area or a vicinity of the periphery of the cover body. The directional vector from a proximal end to a distal end of the flap may be directed to the center from the periphery of the cover, or to the periphery from the center of the cover.

When the aperture, which is configured to be closed with the protrusion of the flap, is defined in the central area of the cover body, the water vapor from the food stuff or an inflating air inside the container assembly can be effectively exhausted therefrom. When the aperture is defined in a vicinity of the peripheral area of the cover body with placing the flap so that the flap directional vector from the proximal end to the distal end is oriented to the center of the cover, the liquid (water) in the container assembly may be discharged through the aperture after cooking. Consequently, the container assembly of the present invention is suitably used when cooking pasta or the like.

Further in the present invention, a number of aperture or flap of the cover body is not limited. When the container is divided by a partition into at least two compartments, the cover may include a plurality of apertures so that each aperture is in fluid communication with each compartment. The position of the flap may be determined depending on the location of the aperture.

A shape in a plain view of the cover and the container assembly of the present invention can be properly selected by a user's demand, for example, circle, oval, triangle, rectangular and other polygonal shapes.

It is preferable to define the concave portion below the distal end of the flap closing the aperture. Therefore, the distal end of the flap may laterally and partly protrude across a top of the concave portion to facilitate engagement with a user's finger and an upward rotation of the flap.

When the flap rotates upwardly until it stands uprightly to the cover body, a groove with an arc cross section appears in a lower surface of the flap at the proximal end. On the other hand, a flat upper surface of the flap appears behind the groove. This configuration limits an upward rotation of the flap from a parallel to an upright position with respect to the upper surface of the cover body. Thus, an excess repeated bending stress on the proximal end of the flap can be avoided so that a life (usable period) of the cover may be extended.

The cover body is preferably provided with a concave area in which the top of the flap is configured not to protrude from that of the cover body when the flap rotates downwardly to engage the protrusion with the aperture of the cover body. Thus, another container assembly can be stably stacked on the cover.

In order to stably stack the container assemblies according to the present invention, the cover may include a peripheral area defining a peripheral contour of the cover, a flap surrounding area at least partly surrounding the flap and an intermediate area therebetween from which the peripheral area and the flap surrounding area are elevated. Thus, one container assembly of the present invention can be stably stacked on another container assembly.

The cover and the container of the present invention are molded from a resin which is not deformed under a thermal condition less than 140 degrees centigrade, more preferably, they are molded from a high crystallinity polypropylene.

Thus, cover and the container assembly molded from the above-described resin may have a heat resistance comparable to a resin film used for a microwave cooking. A dish dryer may be applicable to the cover and the container because they are dishwasher-safe. Further, the high crystallinity polypropylene resin may increase an acceptable rotational repetition (a number of repetition of the flap rotation until the proximal end of the flap breaks).

The cover of the present invention may comprise a tab protruding outwardly from its peripheral edge from the container.

The method for fixing the cover to the container is not limited. For example, the peripheral area of the cover body may be formed to have a U-shaped cross section so as to be engageable with an upper edge of the container. Alternatively, the threaded cover engages with the threaded container. When the container and the cover are threaded, the cover is not blown off due to increased inner pressure in the container assembly. When the inner pressure of the container assembly increases more than a certain pressure, the flap upwardly rotates so that a gas inside the container is released from the aperture of the cover body. Thus, the container assembly of the present invention is suitably used for a cooking under a high pressure.

The present invention further provides a molding device and a manufacturing method for manufacturing a cover and a container assembly including the cover having the above-described advantages.

BRIEF DESCRIPTION OF THE DRAWINGS

Hereinafter, the preferred embodiments of a cover and a container using thereof according to the present invention are explained by referring to drawings.

DETAILED DESCRIPTION OF THE PREFERRED EMBODIMENTS

Figure 1:
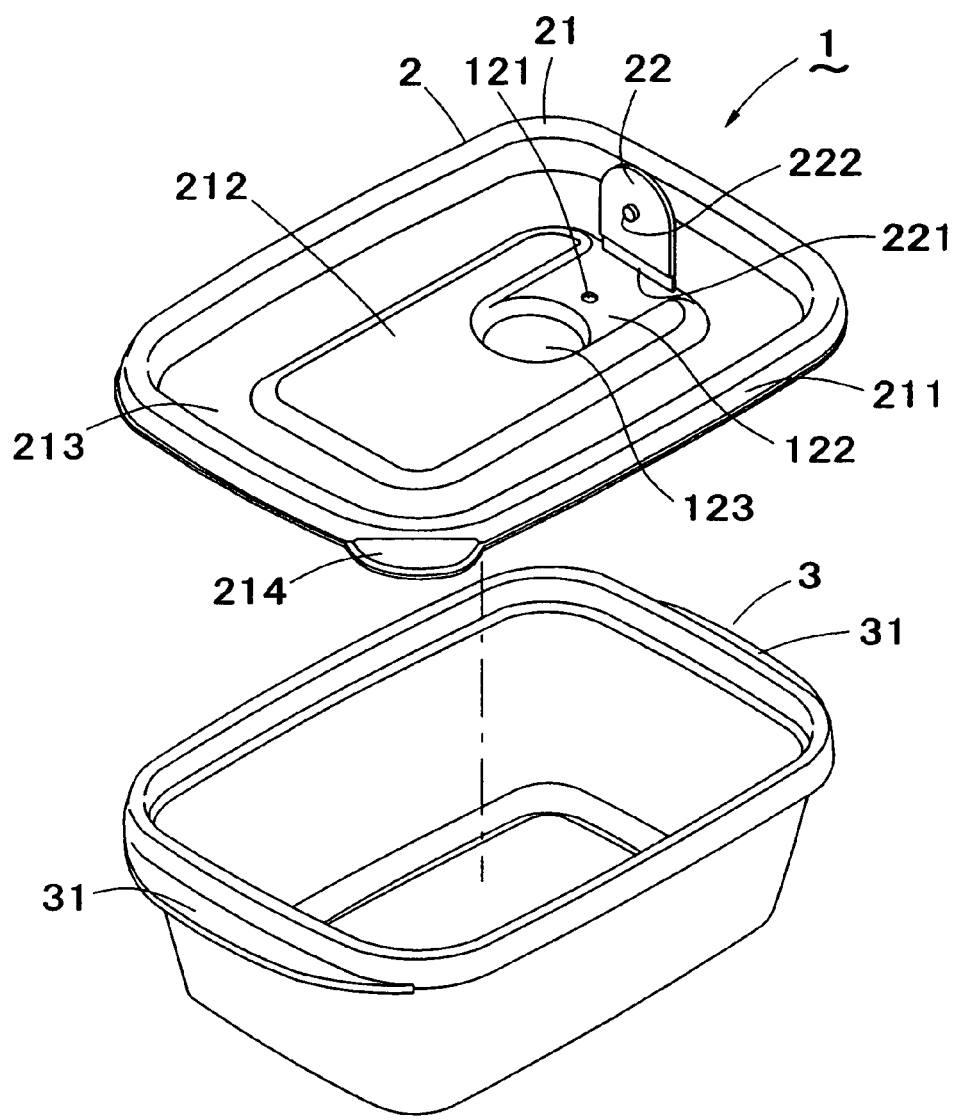
FIG. 1 is an exploded perspective view showing the container assembly of the present invention.
Figure 2:
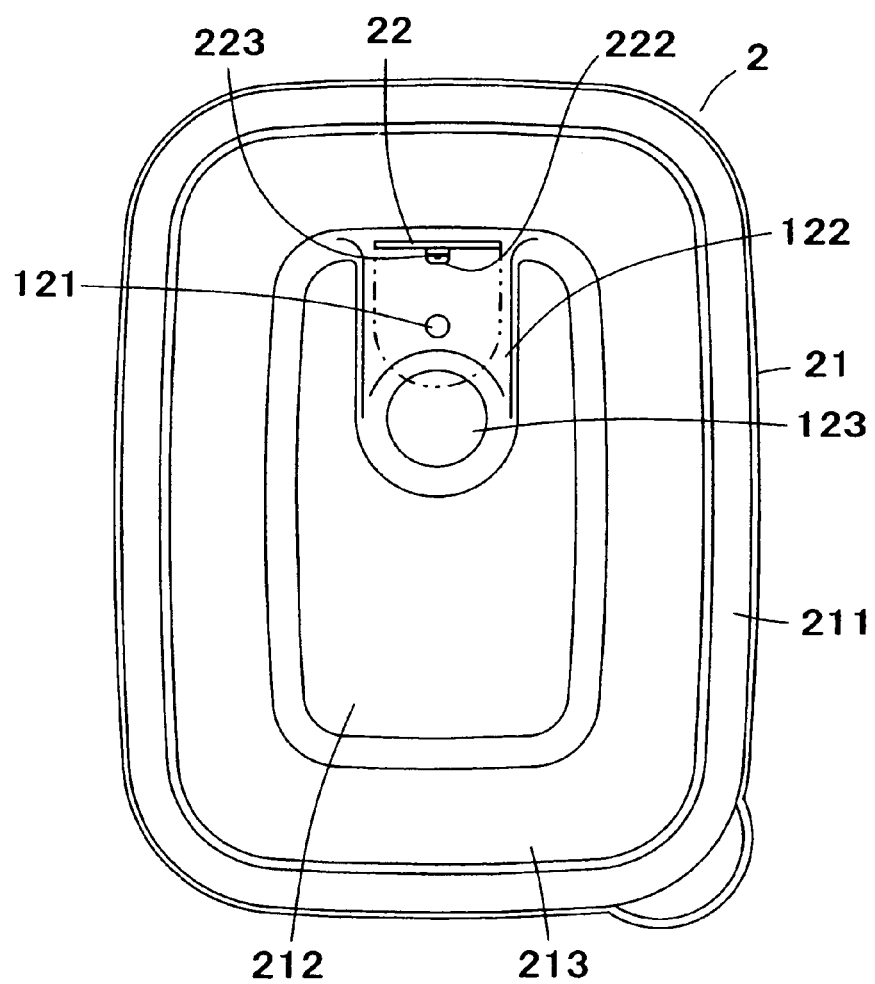
FIG. 2 is a plane view of the cover the container of the present invention.

FIG. 1 is an exploded perspective view of the container assembly of the present invention. FIG. 2 is a plain view of the cover of the present invention.

A container assembly (1) comprises a cover (2) and a container (3). The container (3) has a substantially rectangular cylindrical shape shown in FIG. 1 but not limited to this. It may also have a cylindrical/oval cylindrical shape comprising a bottom, or a triangular cylinder or other polygonal shape. The container (3) contains a desired food stuff. A couple of ears (31) extending from peripheral edges of the container (3) in parallel to each other are configured to facilitate carriage/handling of the container assembly (1).

The cover (2) is configured to have a shape and a size for covering a top opening of the container (3), and an example in FIG. 1 and FIG. 2 shows a substantially rectangular cover (2) similar to a contour of the container (3).

A cover (2) includes a cover body (21) and a flap (22). The cover body (21) comprises a peripheral area (211) defining an outer peripheral contour of the cover, a flap surrounding area (212) at least surrounding the flap (22) and an intermediate area (213) therebetween configured to connect these areas (211, 212). In FIG. 1 and FIG. 2, the flap surrounding area (212) is provided at a center of the cover body (21), but it may be also adjacently provided to the peripheral area (211).

In the example in FIG. 1 and FIG. 2, the peripheral area (211) and the flap surrounding area (212) may be elevated upwardly with respect to the intermediate area (213). Further, the peripheral area (211) may be higher than the flap surrounding area (212). In addition, a tab (214) protruding outwardly from a peripheral area (211) is formed in a substantially semicircle shape configured to facilitate detachable engagement with the container (3).

The flap (22) is a substantially semi-oval thin plate comprising a linear proximal end (221). The linear proximal end (221) of the flap (22) connects with the periphery of the flap surrounding area (212). The flap (22) rotates upwardly and downwardly around the proximal end (221).

A protrusion (222) is formed in a bottom of the flap and an aperture (121) is defined in the flap surrounding area (212). After the flap (22) rotates downwardly until the flap (22) is in parallel with a top surface of the flap surrounding area (212), the protrusion (222) closes the aperture (121).

Figure 3:
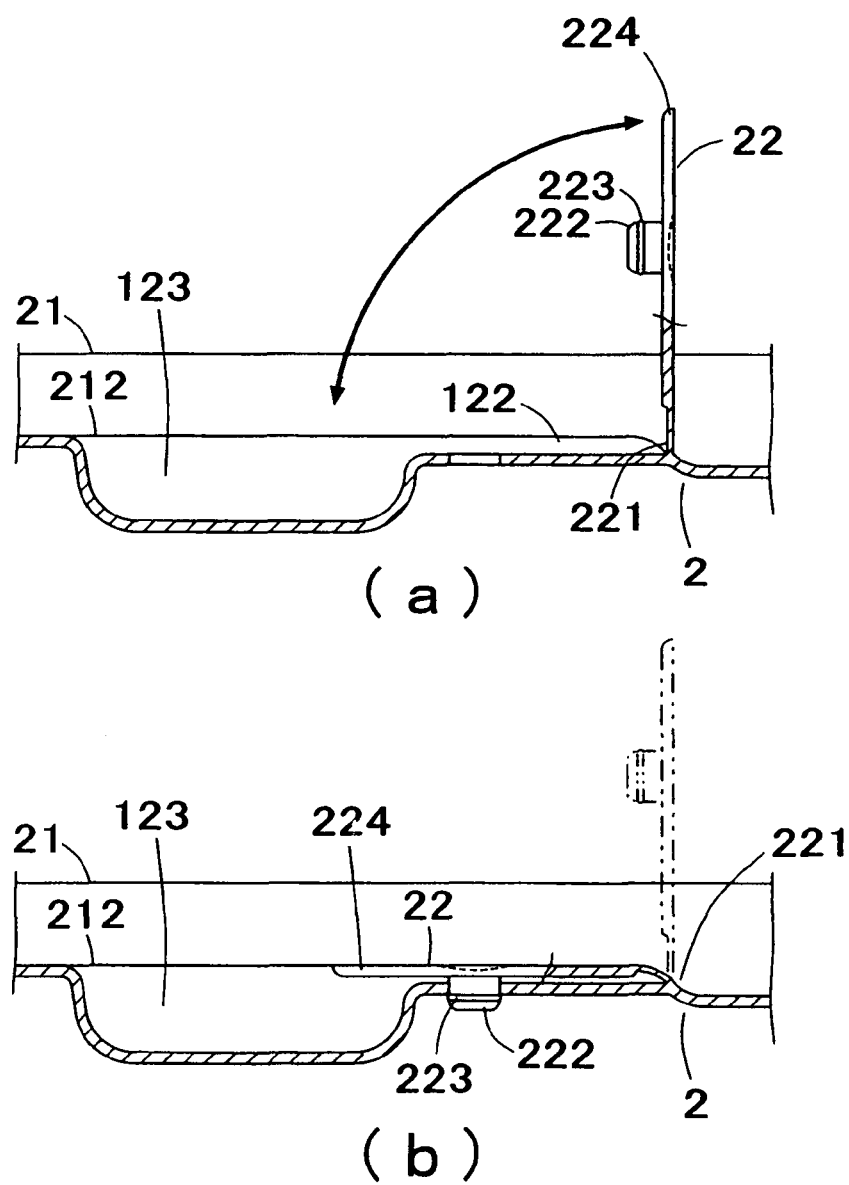
FIG. 3 is an enlarged cross-sectional view around the flap of the cover shown in FIG. 2.

FIG. 3 is a cross-sectional view showing a configuration of the cover (2) around the flap (22). FIG. 3(a) is a cross-sectional view of the flap (22) standing uprightly with respect to the cover body (21) after rotating the flap (22) upwardly. FIG. 3(b) is a cross-sectional view of the flap (22) in parallel with the top surface of the cover body (21) by a downwardly flap rotation.

The flap surrounding area (212) includes a downward concave area (122) and a deeper concave portion (123) adjacently provided thereto. When the flap (22) is downwardly rotated and a top surface of the flap (22) is in parallel with the top surface the cover body (21), a curved distal portion (224) of the flap (22) partly covers over the concave portion (123) so that it laterally extends an upper portion of the concave portion (123). The rest of the flap portion (22) other than the distal portion lies in the concave area (122).

The aperture (121) is formed in the concave area (122). When the flap (22) is downwardly rotated until the top surface of the flap (22) is in parallel with the top surface of the cover body (21), a projection ring (223) formed surrounding a periphery of the protrusion (222) engages with a bottom surface of the cover (2) so that a leveled position of the flap top surface with respect to the top surface of the flap surrounding area (212) surrounding the concave area (122) is fixedly kept.

A user may insert his/her finger into the concave portion (123) defined in the flap surrounding area (212) for accessing the flap bottom (22) in order to rotate upwardly. In addition, when the protrusion (222) plugs the aperture (121), the top surface of the flap does not protrude over the top surface of the flap surrounding area (212). Therefore, another container can be easily stacked on the container assembly (1), for example, in the refrigerator.

Figure 4:
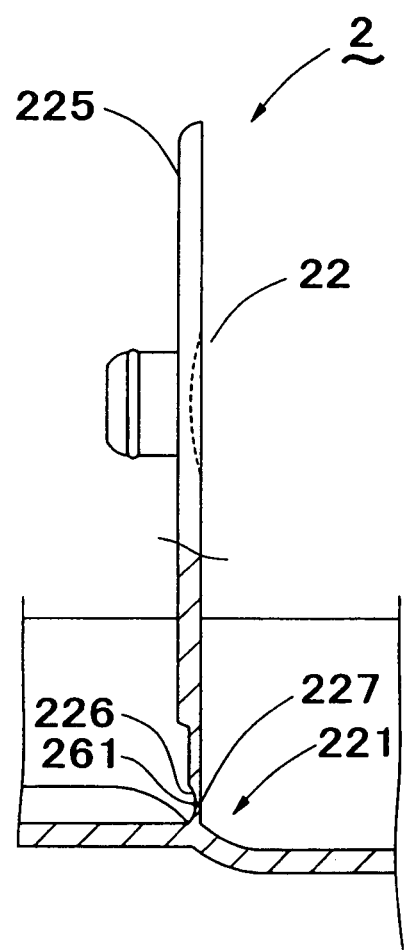
FIG. 4 is a further enlarged view to show of the proximal end configuration of the cover shown in FIG. 2.

FIG. 4 is an enlarged cross-sectional view of the proximal end (221) of the flap (22). At the proximal end (221) of the flap (22), a groove (226) with an arc cross section is defined in a flap bottom (225) (referred herein to a lower surface of the flap (22) after its downward rotation). The groove (226) appears when the flap (22) stands uprightly to the cover (2) while a flat upper surface (227) of the flap appears behind the groove (226). The groove (226) facilitates the flap rotation while the flap top (227) at the upright position prevents further upward rotation of the flap (22) so that a rotation range is controlled between 0 degree (the flap (22) lies on the cover (2)) and 90 degrees (the flap (22) uprightly stands to the cover (2)).

When the flap (22) is downwardly rotated, the proximal end (221) of the flap (22) is bent around a deepest bottom line (261) of the groove (226).

Figure 5:
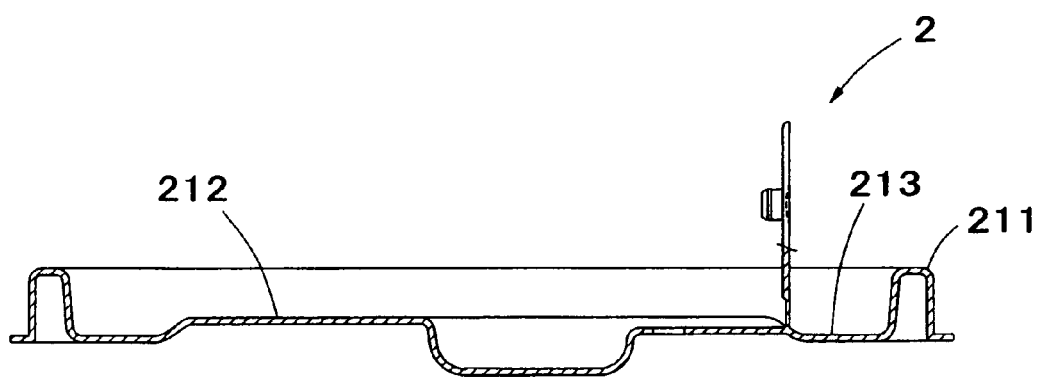
FIG. 5 is a cross-sectional view of the cover shown in FIG. 2.

FIG. 5 is a cross-sectional view of the cover (2). The peripheral area (211) defining the outer contour of the cover (2) surrounds and upwardly protrudes to the intermediate area (213). An upper edge of the peripheral area (211) is provided above the top surface of the flap surrounding area (212).

As shown in FIG. 5, the peripheral area (211) is formed to have a substantially U-shaped cross section so as to engage with an upper edge of the container (3).

Figure 6:
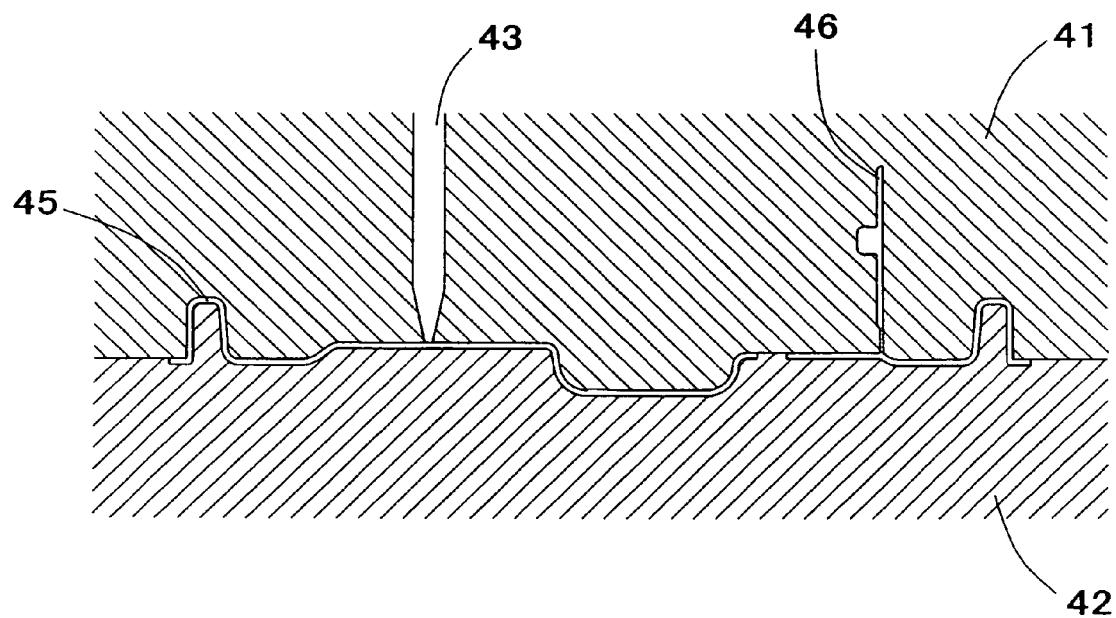
FIG. 6 is a schematic cross-sectional view of the resin-molding mold for the cover shown in FIG. 2.

FIG. 6 shows a shape of a cavity of a molding device for molding the cover (2).

The molding device comprises a fixed mold (41) and a moveable mold (42) configured to form a first cavity (45) therebetween for molding the cover body (21) of the cover (2). The fixed mold also includes a second cavity (46) for molding the flap (22). The second cavity (46) communicates with the first cavity between the fixed mold (41) and the moveable mold (42). Further, an injection portion (43) for injecting a molten-resin is provided with the fixed mold (41).

As clearly shown in FIG. 6, the second cavity (46) is configured to stand at a right angle with respect to the first cavity (45). The cavities (45, 46) make it possible to integrally mold the flap (22) and the cover body (21) with a co-injection molding as the molten resin surely flows into the second cavity (46) for molding the flap (22) through the first cavity (45).

Figure 7:
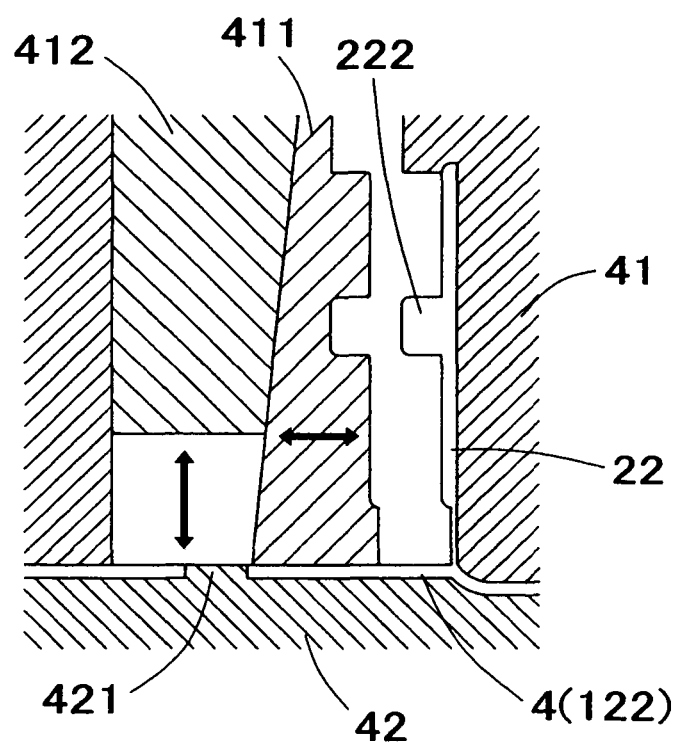
FIG. 7 is an enlarged view to show detail configuration of the mold in FIG. 6.

FIG. 7 shows a configuration of the molding device shown in FIG. 6 around the second cavity (46) for a flap (22), wherein the molding device is in an open position after a molten-resin injection.

The fixed mold (41) comprises a lateral sliding block (411) including a molding surface configured to mold flap surface including a protrusion. A slope surface is opposite to the molding surface of the lateral sliding block (411), which is biased toward a protruding direction of the protrusion (222) by a biasing means such as a spring (not shown).

The fixed mold (41) further comprises a vertical sliding block (412) adjacent to a slope surface of the lateral sliding block (411). The vertical sliding block (412) includes a substantially right trapezium cross section. A slope surface of the vertical sliding block (412) is complementary to and adjacent to the slope surface of the lateral sliding block (411). An actuator (not shown) such as a cylinder connects to the vertical sliding block (412) to move upwardly and downwardly.

During molding the cover (2), the vertical sliding block (412) is at a lower limit position where a bottom of the vertical sliding block (412) to a top of the protrusion (421) upwardly protruding from a cavity surface of the moveable mold (42) to penetrate the first cavity (45). The protrusion (421) defines the aperture (121) of the cover (2).

The vertical sliding block (412) moves upwardly in an opening operation of the molding device. The lateral sliding block (411) is biased to the slope surface of the vertical sliding block (412) by the biasing means so that a vertical movement of the vertical sliding block (412) causes a lateral movement of the lateral sliding block (411) (in a protruding direction of the protrusion (222)) to be separated from the molded flap (22). Thus, the protrusion (222) of the molded flap (22) is completely separated from the lateral sliding block (411). Then, the moveable mold (42) is moved downwardly so that the molded cover (2) is removed from the fixed mold without any interference with the protrusion (222) of the flap (22).

The type of the molten resin injected from the injection portion (43) is not limited but it is preferable to have a heat resistance high enough for the cover (2) not to deform under a thermal condition less than 140 degrees centigrade, because the container assembly (1) of the present invention may be used in a cooking device such as a microwave. A high crystallinity polypropylene may be a preferable material, for example. Even after an endurance test in which the flap (22) of the cover (1) molded from the high crystallinity polypropylene was repeatedly rotated between an open position and a closed position (more than 3,000 times of repeated rotation of the flap (22)), the flap (22) did not break out.

Figure 8:
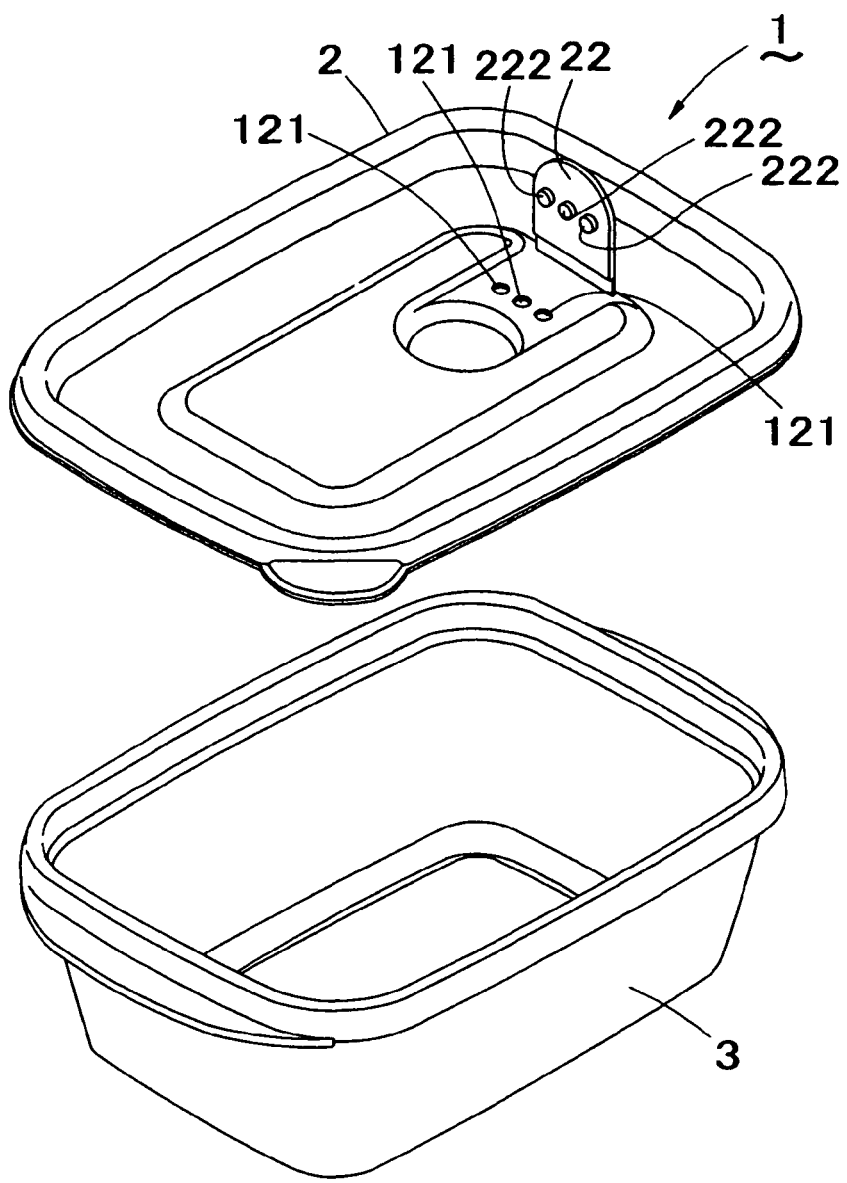
FIG. 8 is an exploded perspective view showing another embodiment of the cover of the present invention.

FIG. 8 is a perspective view of a modified embodiment from the container assembly (1) in FIG. 1 to FIG. 6.

The container assembly (1) in FIG. 8 is formed with a plurality of the protrusions (222) (3 protrusions in FIG. 8) with the flap (22). The cover body (21) is also formed with the plurality of apertures (121) corresponding to the protrusions (222). When the flap (22) is rotated downwardly, the protrusions (222) engage with the corresponding apertures (121), respectively. Therefore, apertures (121) are capable of exhausting a larger volume of inflating gas in the container assembly (1) in heating.

Figure 9:
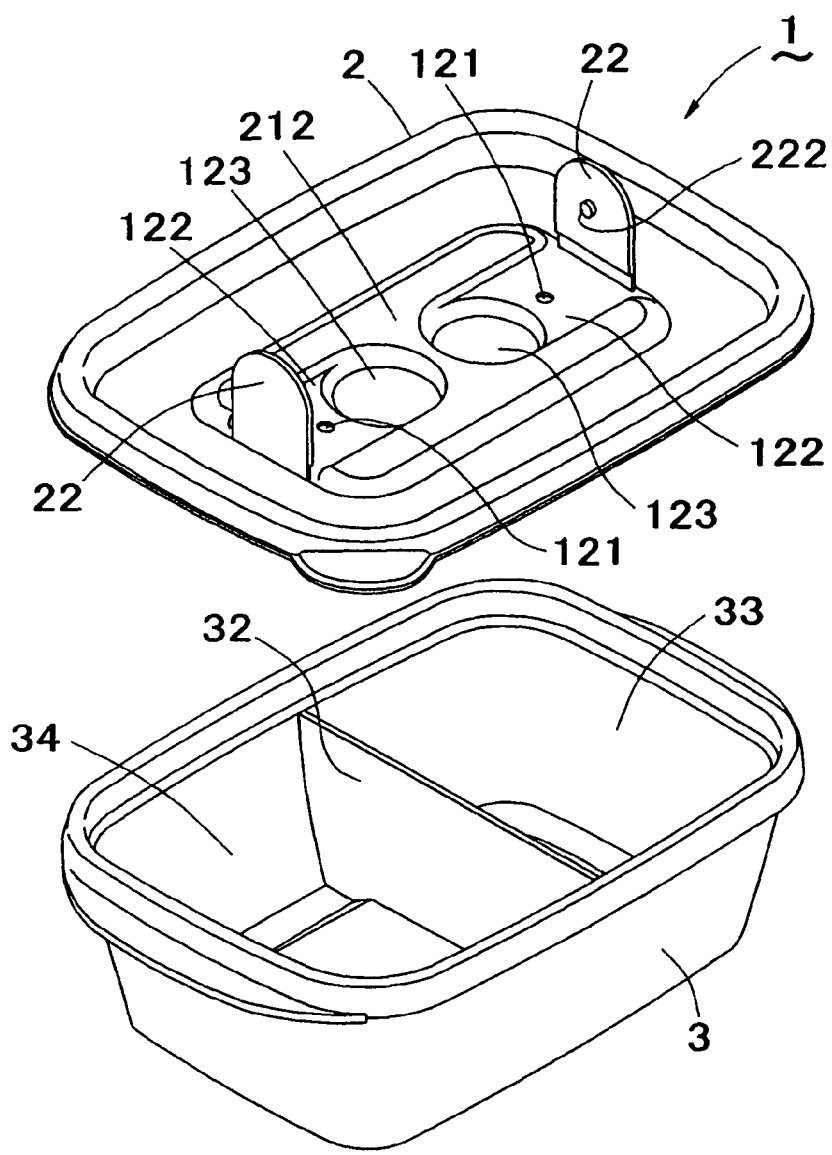
FIG. 9 is an exploded perspective view showing another embodiment of the container of the present invention.

FIG. 9 is a perspective view of another modified embodiment from the container assembly (1) in FIG. 1 to FIG. 6.

The container assembly (1) in FIG. 9 comprises a plurality of the flaps (22) (2 flaps in FIG. 9). Each flap (22) configured to face each other extends toward the center of the flap surrounding area (212). The flap surrounding area (212) is formed with the concave areas (122) and the concave portions (123) provided for each flap (22). Each flap (22) comprises the protrusion (222) and the concave area (122) is formed with the aperture (121) engaging with the protrusion (222). The configuration of the concave area (122), the concave portion (123), the protrusion (222) and the aperture (121) are the same as what is explained relating to the FIG. 1 to FIG. 6.

The container (3) includes a partition (32) configured to divide an inner space of the container into at least two compartments (33, 34). The apertures (121) are in fluid communication with the compartments, respectively when the cover (2) is attached to the container (3).

Generally, a volume of water vapor depends on a type of a food stuff to be heated. Thus, a concentration of the water vapor in the spaces (33, 34) of the container (3) may be different from each other during a heating process if every space (33, 34) contains a different food stuff, which leads to an inner pressure difference between the inner spaces (33, 34).

For example, if just one aperture (121) is provided on a cover (2) (like the container assembly (1) described in context with FIG. 1 to FIG. 6), the aperture (121) may communicate with either of the spaces (33, 34). In a closed space, with which the aperture (121) does not communicate, an inner pressure will rapidly and extremely go up as a temperature elevation compared with that in an open space with which the aperture (121) communicates, which may result in blowing of the cover from container (3).

As shown in FIG. 9, the container (3) having a plurality of the apertures (121) in fluid communication with each space (33, 34) and a plurality of the flaps (22) including the protrusions (222) which close the apertures (121) prevents the cover (2) from being blown off because the inflating gas can be surely exhausted from each space (33, 34).

Figure 10:
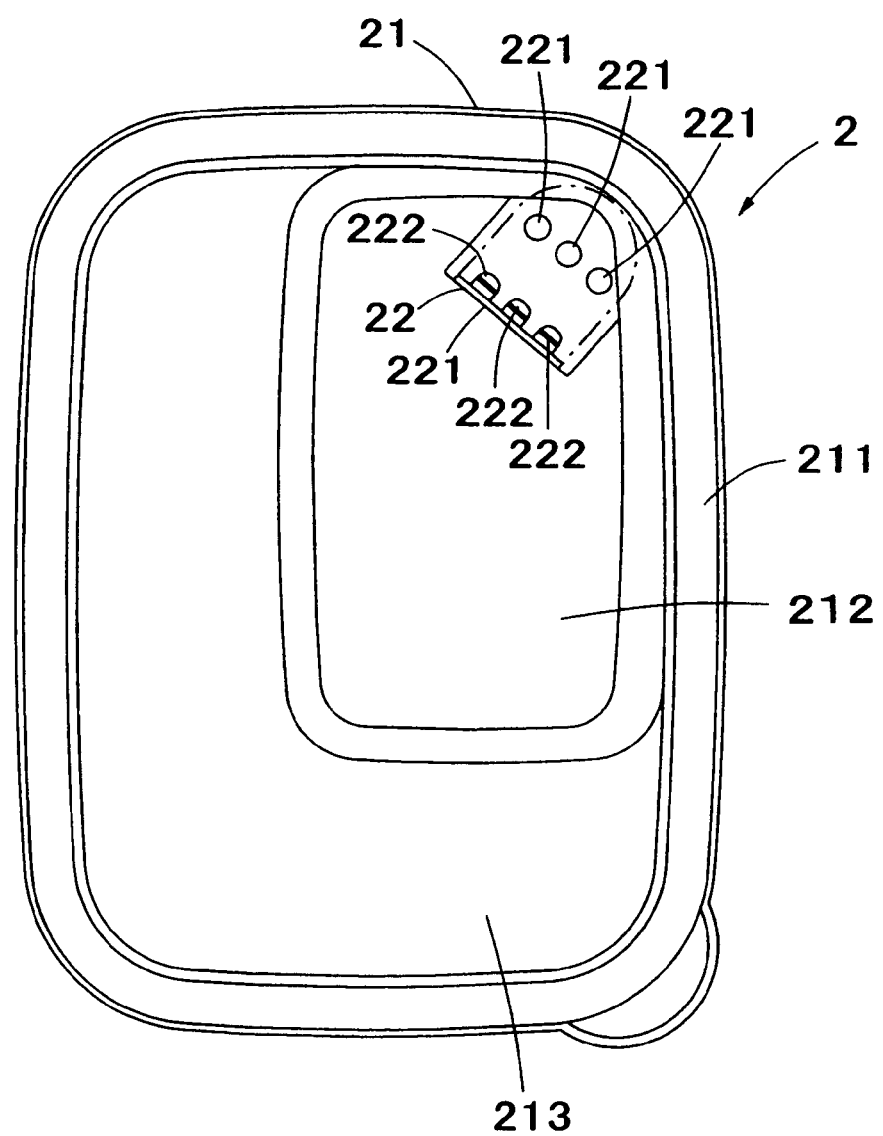
FIG. 10 is a plain view showing another embodiment of the cover used for the container of the present invention.

FIG. 10 is a plain view of the modified embodiment from the cover (2) shown in FIG. 1 to FIG. 6.

The flap (22) of the cover (2) shown in FIG. 10 is adjacently provided in the peripheral area (211) of the cover body (21). The flap (22) is surrounded by the flap surrounding area (212).

The flap surrounding area (212) in FIG. 10 is a substantially rectangular shape of which one of corners is adjacent to one of corners of the substantially rectangular peripheral area (211). A couple of the edges of the flap surrounding area (212) defining its corner adjacent to a corner of the peripheral area (211) is coincident with the border of the peripheral area (211).

The aperture (121) is defined around the corner of the flap surrounding area (212) adjacent to the corner of the peripheral area (211). The flaps (22) are also provided with the protrusions (222) closing the aperture (121).

The proximal end (221) of the flap (22) is located more inwardly to the center of the cover than its distal end. The peripheral area (211) and the flap surrounding area (212) are elevated with respect to the intermediate area (213) connecting these areas (211, 212). The distal end of the flap (22) protrudes to a valley formed with 2 adjacent slopes of the peripheral area (211) and the flap surrounding area (212). Thus, the embodiment in FIG. 10 does not have the concave portion (123) in the cover (2) as shown in FIG. 1 to FIG. 6, but only the concave area (122) receiving the flap (22).

Therefore, the container assembly (1) can discharge the liquid (water) generated from the food stuff therein through the aperture (121) defined at the corner of the cover (2).

Figure 11:
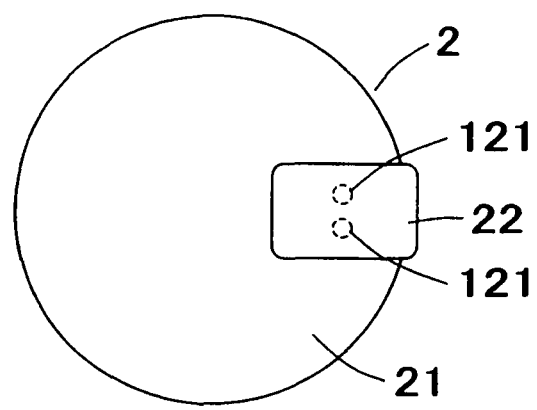
FIG. 11 shows another embodiment of the container of the present invention.
Figure 11:
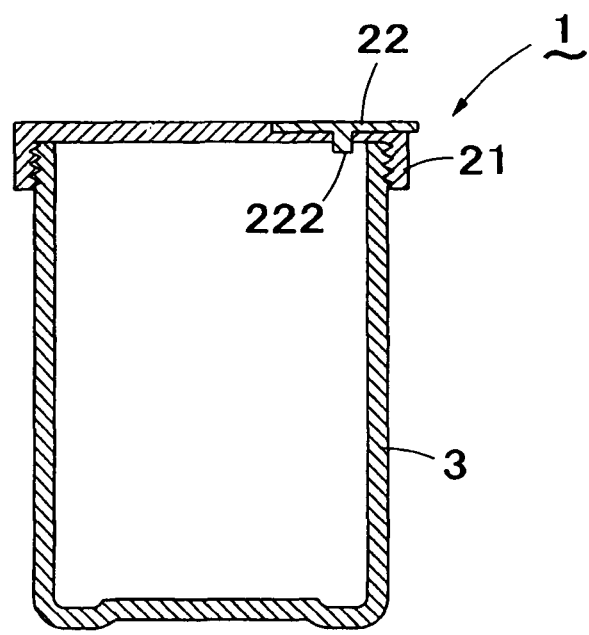

FIG. 11 shows a modified embodiment from the cover (2) in FIG. 10. FIG. 11(a) is a plain view of the cover (2) and the FIG. 11(b) is a cross-sectional view of the container assembly (1) to which the cover (2) in FIG. 11(a) is attached.

The cover (2) in FIG. 11 is formed in a cylindrical shape comprising a top and the aperture (121) is formed in a vicinity of the periphery of the cover (2). The cover (2) includes the flap (22) of which the distal end outwardly extends from the outer edge of the cover body (21). The flap (22) includes the protrusion (222) which closes the aperture (121) when the flap (22) is downwardly rotated.

An inner surface of the cover (2) and an upper outer surface of the container (3) are threaded.

The container assembly (1) in FIG. 11 is, for example, suitably used for cooking noodles such as pasta through the following steps:
a) put the dried pasta in the container (3) then pour hot water;
b) cover the container with cover (2) and rotate the flap (22) upwardly;
c) put the container assembly (1) in the microwave and boil the pasta in the container assembly (1); and
d) after the pasta is boiled, remove the container assembly from the microwave and discharge the hot water in the container assembly (1).

Consequently, only the boiled pasta remains in the container assembly (1).

Thus, the container assembly (1) of the present invention may be used for boiling the food stuff easily.

Further, friction force between the protrusion (222) and the aperture (121) or their sizes may be designed so that the flap (22) upwardly rotates when the inner pressure of the container assembly (1) exceeds a predetermined pressure. In this case, the container assembly (1) of which the aperture (121) is plugged with the protrusion (222) of the flap (22) lying on the top of the container (21) can be put in the microwave. For example, when the container assembly (1) containing a grain such as a potato is microwaved with closing the aperture (121), the potato can be boiled under a high pressure in the container assembly (1) so that the boiling time can be saved. In addition, when the pressure in the container assembly (1) exceeds the predetermined value, the flap (22) rotates upwardly so that the container assembly (1) will not burst.

A fixing method of the cover (2) with the container (3) is not particularly limited. The cover (2) formed in a cylindrical shape having a threaded outer surface may be engaged with the container (3) having a threaded upper inner surface.

Figure 12:
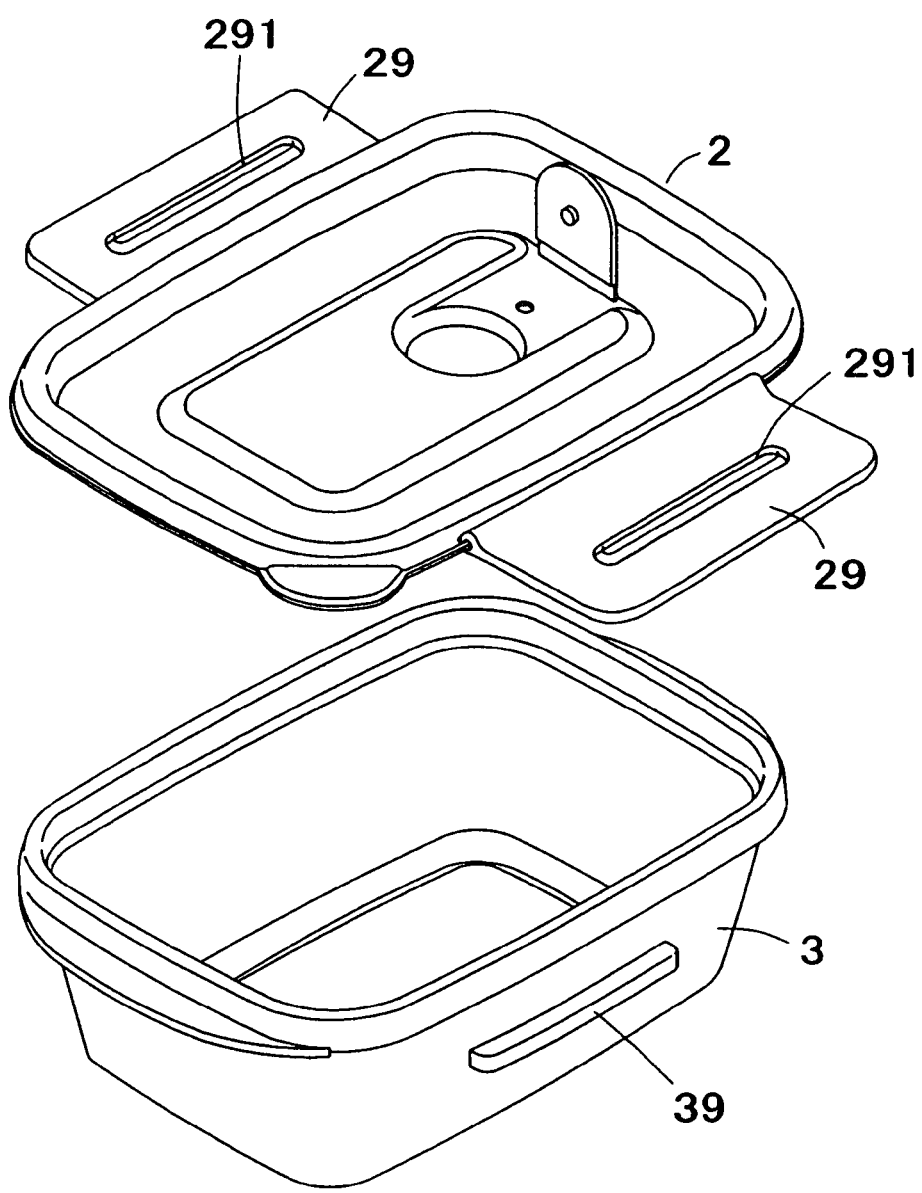
FIG. 12 is an exploded perspective view showing another embodiment of the container of the present invention.

Alternatively, as shown in FIG. 12, an ear (29) configured to rotate upwardly and downwardly may be attached to the periphery of the cover (2), and the outer surface of the container (3) can be provided with a ridge (39) configured to engage with an aperture (291) defined in a center of the ear (29). Thus, the ear (29) and the protrusion (39) are mechanically engaged.

Figure 13:
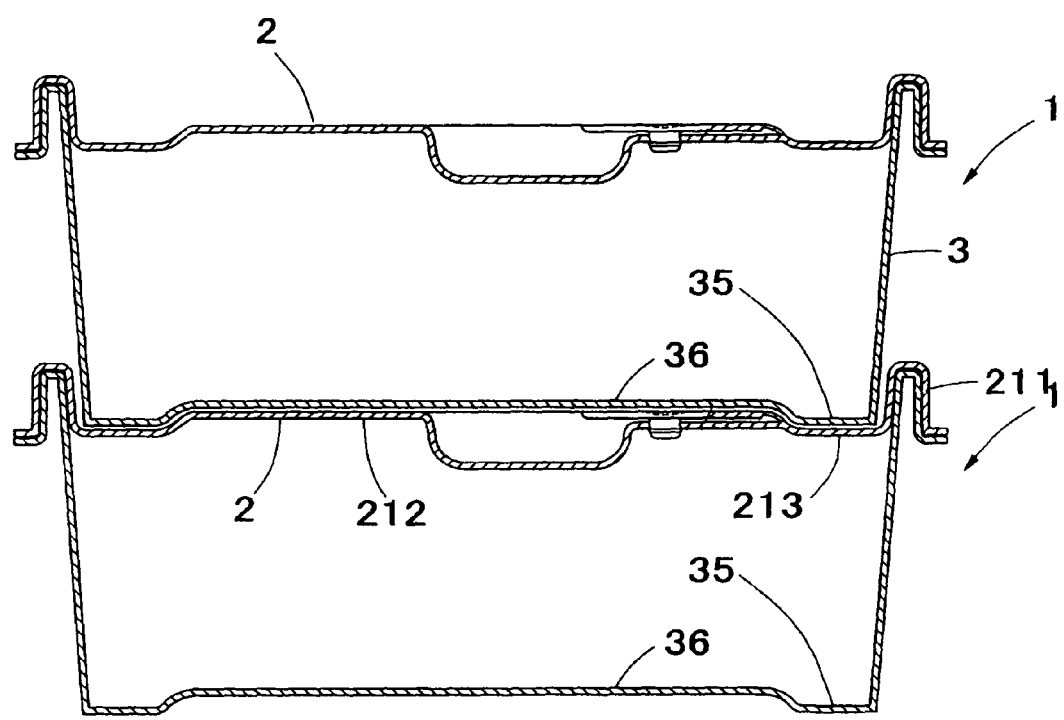
FIG. 13 is a cross-sectional view showing the stacked container of the present invention.
Figure 14:
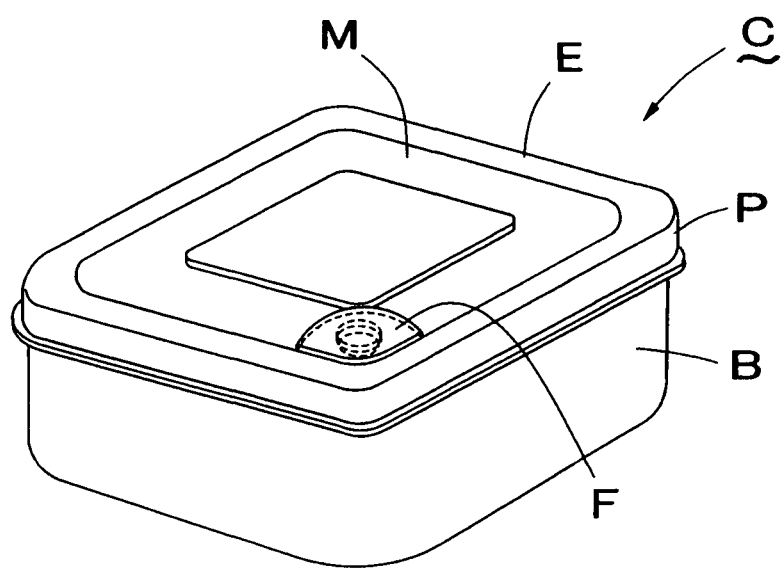
FIG. 14 is a perspective view of the conventional container assembly.
Figure 15:
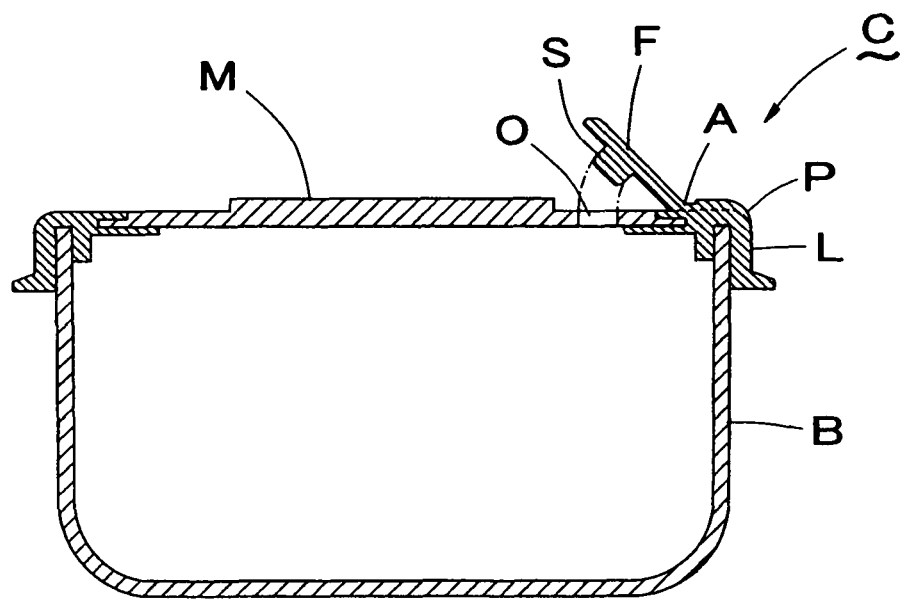
FIG. 15 is a cross-sectional view of the conventional container assembly.
Figure 16:
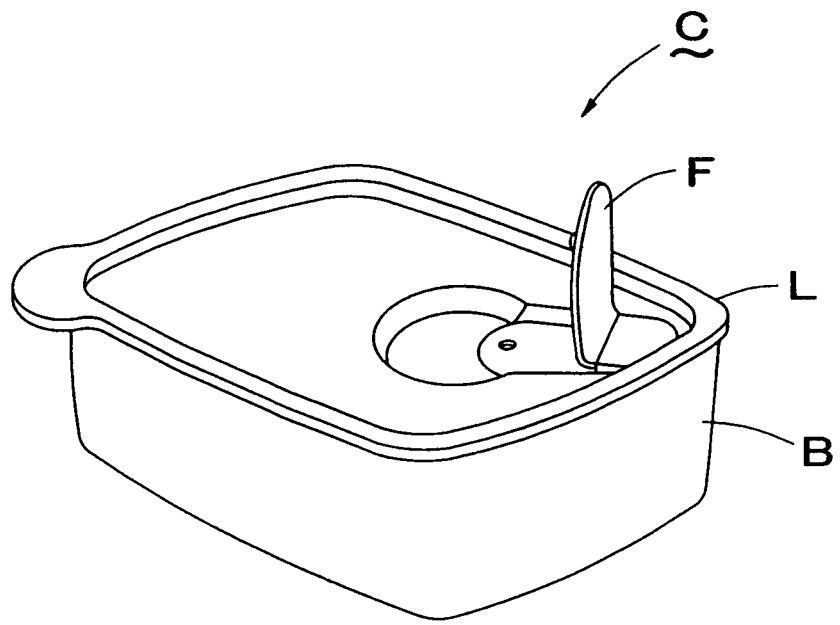
FIG. 16 is a perspective view of the conventional container assembly.

FIG. 13 is a cross-sectional view showing the container assembly (1) described in context with FIG. 1 to FIG. 6 in a stacking package.

The bottom of the container (3) comprises a peripheral area (35) defining the contour thereof and a central area (36) surrounded by the peripheral area (35). The central area (36) curves upwardly.

As described above, the peripheral area (211) of the cover (2) and the flap surrounding area (212) in the center of the cover (2) are elevated with respect to the intermediate area (213) connecting these areas (211, 212).

When one container assembly (1) is placed on another container assembly (1), the flap surrounding area of the cover (2) is received in the central area (36) of the bottom of the container (3). Also, the peripheral area (35) of the bottom of the container (3) contacts with the intermediate area (213) between the flap surrounding area (212) and the peripheral area (211).

Thus, stable stacking of the container assemblies (1) can be achieved.

The present invention can be used as a container used with a cooking device for household use such as a microwave.

What is claimed is:

1. A cover for covering an opening of a container for heating a food stuff comprising:
    an elevated peripheral portion defining an outer contour of the cover and configured to engage with an edge of the container defining its opening,
    an elevated area surrounded by and positioned apart from the elevated peripheral portion, the elevated area being lower than the peripheral portion,
    an intermediate area extending from the elevated peripheral portion to the elevated area, the intermediate area being lower than the elevated area,
    at least one air vent port defined in the elevated area,
    at least one flap including a proximal end formed continuously with an edge of the elevated area, the at least one flap configured to rotate around the proximal end,
    a protrusion extending from a first surface of the at least one flap and configured to plug the at least one air vent port when the flap reaches a first position where the at least one flap is received in a concave area defined in the elevated area,
    a groove defined at the proximal end in the first surface of the at least one flap wherein a second surface opposite to the first surface at the proximal end is straight when the flap stands upright to the concave area.

2. The cover in claim 1, wherein the second surface of the at least one flap does not protrude from a surface of the elevated area when the at least one flap reached a first position.

3. The cover in claim 1 wherein the cover is not deformed under a thermal condition less than 140 degrees centigrade.

4. The cover in claim 1 wherein the cover is molded from a high crystallinity polypropylene.

5. The cover in claim 1 wherein the at least one air vent port comprises a plurality of the air vent ports.

6. The cover in claim 1 further comprising a tab protruding outwardly from a peripheral edge of the cover.

7. The cover in claim 1, wherein the proximal end of the at least one flap is located farther away from a center of the cover than a distal end of the flap.

8. The cover in claim 1, wherein the elevated area includes a concave portion adjacent to the concave area, a distal end of the flap partly covers across the concave portion when the at least one flap reaches the first position.

9. The cover of claim 1, wherein the intermediate area surrounds the elevated area.

10. A container assembly for heating a food stuff comprising a container including a bottom and at least one side wall surrounding the bottom, and a cover for covering an opening of the container comprising:

an elevated peripheral portion defining an outer contour of the cover and configured to engage with an edge of the container defining its opening, an elevated area surrounded by and positioned apart from the elevated peripheral portion, the elevated area being lower than the peripheral portion, an intermediate area extending from the elevated peripheral portion to the elevated area, the intermediate area being lower than the elevated area, at least one air vent port defined in the elevated area, at least one flap including a proximal end formed continuously with an edge of the elevated area, the at least one flap configured to rotate around the proximal end, a protrusion extending from a first surface of the at least one flap and configured to plug the at least one air vent port when the flap reaches a first position where the at least one flap is received in a concave area defined in the elevated area, a groove defined at the proximal end in the first surface of the at least one flap wherein a second surface opposite to the first surface at the proximal end is straight when the flap stands upright to the concave area.

11. The container assembly in claim 10, wherein the second surface of the at least one flap does not protrude from a surface of the elevated area when the at least one flap reached a first position.

12. The container assembly in claim 10, wherein the cover is not deformed under a thermal condition less than 140 degrees centigrade.

13. The container assembly in claim 10, wherein the cover is molded from a high crystallinity polypropylene.

14. The container assembly in claim 10, wherein the at least one air vent port comprises a plurality of the air vent port in the cover body.

15. The container assembly in claim 10 further comprising a tab protruding outwardly from a peripheral edge of the cover.

16. The container assembly in claim 10, wherein the proximal end of the at least one flap is located farther away from a center of the cover body than a distal end of the flap.

17. The container assembly in claim 10, wherein the elevated area includes a concave portion adjacent to the concave area, a distal end of the flap partly covers across the concave portion when the at least one flap reaches the first position.

18. The container assembly in claim 10 further comprising a partition configured to divide an inner space of the container into a plurality of compartments, wherein the at least one flap comprises a plurality of the flaps, the at least one air vent port comprises a plurality of the air vent ports configured to communicate with the plurality of the compartments, respectively, and each flap closes each air vent port with the protrusion.

19. The container assembly in claim 10, wherein the intermediate area surrounds the elevated area.

* * * * *